United States Patent [19]

Turner

[11] Patent Number: 4,640,332

[45] Date of Patent: Feb. 3, 1987

[54] AWNING SUPPORT ASSEMBLY

[76] Inventor: Joe D. Turner, 2807 W. Prairie Creek, Richardson, Tex. 75080

[21] Appl. No.: 760,322

[22] Filed: Jul. 29, 1985

[51] Int. Cl.$^4$ ............................................. E04F 10/06
[52] U.S. Cl. ...................................... 160/46; 160/65; 160/71; 160/80
[58] Field of Search ....................... 160/45, 46, 66, 67, 160/68, 69, 71, 72, 80

[56] References Cited

U.S. PATENT DOCUMENTS

| | | | |
|---|---|---|---|
| 2,622,663 | 12/1952 | Burd . | |
| 2,652,885 | 9/1953 | Engel . | |
| 2,752,992 | 7/1956 | D'Azzo | 160/46 |
| 2,901,035 | 8/1959 | Anderle . | |
| 3,025,866 | 3/1962 | Cockrum | 160/46 |
| 3,327,724 | 6/1967 | Nielsen | 160/46 |
| 3,720,438 | 3/1973 | Johnson | 160/46 |
| 3,789,903 | 2/1974 | Clark et al. . | |
| 3,918,510 | 11/1975 | Hayward | 160/68 |
| 3,923,074 | 12/1975 | McKee | 160/68 |
| 4,020,888 | 5/1977 | Upton | 160/66 |
| 4,077,419 | 3/1978 | Lux | 160/66 |
| 4,164,972 | 8/1979 | Bennett | 160/66 |
| 4,171,013 | 10/1979 | Clark | 160/70 |
| 4,188,964 | 2/1980 | Greer | 160/67 |
| 4,214,621 | 7/1980 | Wessels et al. . | |
| 4,258,778 | 3/1981 | Upton et al. . | |
| 4,301,851 | 11/1981 | Gitkin . | |
| 4,393,915 | 7/1983 | Olson . | |
| 4,507,831 | 4/1985 | McClure . | |

FOREIGN PATENT DOCUMENTS 2027369 8/1969 Fed. Rep. of Germany ........ 160/68

Primary Examiner—Reinaldo P. Machado
Attorney, Agent, or Firm—Christensen, O'Connor, Johnson & Kindness

[57] ABSTRACT

An awning support assembly for an awning apparatus (20) mounted on a vehicle (24) includes a clamp assembly (60) attachable at any point along a support tube (30) of the awning apparatus. Clamp assembly (60) has two clamp members (62,64), each having hook-shaped ends (66,68) engageable within grooves or openings in support tube (30). The opposite adjacent ends of clamp members (62,64) when drawn together pull clamp assembly (60) against support tube (24). A telescoping compression member (34) is rotatably attached to clamp (60) to push outwardly on support tube (30). A lever (90) is manually operated to extend compression member (36) to impart a desired load on support tube (30). A telescoping leg support (38) is rotatably connected to clamp assembly (60) and is locked in desired extended position by movable rack (136) engaging fixed rack (134). The upper end of a tie-down strap (40) loops through clamp assembly (60) and the lower end of the strap may be staked or fixedly attached to an immovable object through a plate (44).

27 Claims, 6 Drawing Figures

AWNING SUPPORT ASSEMBLY

TECHNICAL FIELD

The present invention relates to awnings and, more particularly, to a support assembly for awnings adapted for mounting on a supporting structure such as a recreational vehicle or a building.

BACKGROUND OF THE INVENTION

Retractable awnings are commonly used on recreational vehicles or buildings to provide overhead protection against the sun, rain, etc. Such awnings are typically permanently mounted on the vehicle or building to extend outwardly from one side thereof, such as the side on which a door is located. The awnings are collapsible for storage. In typical basic construction, this type of awning commonly includes a fabric canopy having an inward edge portion attached along the upper portion of the sidewall of a building or vehicle. The outer edge portion of the canopy is secured to a support tube, usually hollow and sometimes with a wind-up mechanism to roll the canopy around the support tube in a manner somewhat similar to the operation of a window shade. Usually, the support tube is constructed with one or more longitudinal grooves for receiving a bead formed at the outer edge of the canopy. The support tube is supported by telescoping legs which extend either downwardly to the ground or backwardly to low anchor points on the vehicle. In addition, telescoping arms or struts extend outwardly from the upper portion of the vehicle or building wall to intersect the ends of the support tube.

When the awning is not in use, the support struts are retracted and disconnected and the support legs are retracted to place the support tube alongside the vehicle or building wall with the canopy rolled up thereon. For extension of the awning, the legs, attached to the ends of the support tube, are extended and the support struts are telescoped outwardly to force the support tube away from the vehicle or building thereby unrolling the canopy from the tube. Examples of such vehicle or building awnings are disclosed by U.S. Pat. Nos.: 3,789,903; 3,918,510; 4,020,888; 4,077,419; 4,164,972; 4,171,013; and, 4,188,964.

One difficulty with known awnings, such as those disclosed in the foregoing patents, is that the intermediate portion of the support tube, especially in longer awnings, tends to sag downwardly under its own weight. Also the intermediate portion of support tubes, again especially on longer awnings, tends to bow inwardly toward the vehicle or building thereby failing to maintain the canopy in taut condition, causing it to sag or flap excessively in the wind. Another common problem with awnings is that the wind tends to lift the canopy, together with the support tube, upwardly. It can be appreciated that the reaction of the wind against the large surface area of the canopy can generate a substantial upward force acting on the awning.

To overcome the difficulties of known awnings, the present invention provides various supporting members for supporting an awning, including auxiliary support legs which can be used to support the intermediate, or even the ends of the support tube. The present invention also provides supporting members in the form of auxiliary rafters or compression members that push outwardly against the intermediate portions of the support tube to assist in maintaining the canopy in taut condition. In addition, tie-down straps are provided to anchor intermediate portions of the support tube to the ground.

In known awnings attachment of supporting members to awning support tubes, such as in the types shown in the '621, '419, and '510 patents, require either a permanent attachment point be provided on the support tube or access to the ends of the support tube to insert fittings into the grooves of the support tube. Thus, either modification of existing support tubes for providing permanent attachment points is required to add additional or optional supporting members. Alternatively, access to the ends of the support tubes is required so that such optional members could be engaged with longitudinal grooves extending along the length of the support tubes. However, the support legs attached to the ends of the tube and perhaps portions of the wind-up mechanism must be disassembled to gain this access. The present invention overcomes this difficulty of known awnings by providing an attachment or clamping assembly whereby optional supporting members, such as legs, rafters or compression members, and tie-down straps can be conveniently attached to the support tube at any desired location along the tube without requiring modifications to the tube or access to the ends of the tube.

SUMMARY OF THE INVENTION

The present invention provides an attachment or clamping assembly for disengageable attachment of various awning support members to the support tubes by use of the openings or grooves that extend along the length of the support tube. The clamping assembly includes two elongate, curved members formed with hook-shaped distal ends that are insertable into the grooves of the support tube at any location along the grooves while also providing firm attachment within the grooves. The opposite adjacent ends of the two elongate members are clamped together to tighten the members circumferentially about the support tube. Tabs are provided on the adjacent ends of the elongate members through which holes are formed for reception of a fastener to pull the tabs together and tightly clamp the two elongate members to the support tube.

The present invention further includes at least one compression member for pushing outwardly on an intermediate portion of the support tube to help prevent the tube from bowing inwardly toward the vehicle or other structure on which the awning is mounted. The outer end of the compression member is pivotally attached to a clamping assembly thereby to attach the compression member to the support tube. In a preferred form the compression member has two elongate end sections slidably engaged within a third, elongate, center section. The three sections can be locked in a desired extended position through use of fixed racks mounted to the two end sections that engage with movable racks mounted on the ends of the center section. The movable racks can be shifted into and out of locking engagement with the fixed racks.

In a further aspect of the compression member, a manually-operable lever is pivotally mounted on the end section of the compression member which is attached to the support tube at a location next to the adjacent end of the center section. Pivoting the lever away from the support tube and towards the center section causes the lever to contact the end of the center section and thereby forcibly extending the end section relative to the center section. The use of the pivot arm provides a mechanical advantage to force the canopy fabric into taut condition.

In a further aspect of the present invention, a leg support particularly adapted for supporting an intermediate portion of the support tube is provided. The support leg can be attached at any point along the support tube by use of the above-discussed attachment clamp assembly. The leg support is attached to the clamp assembly preferably in the same manner as the compression member. The leg support ideally is composed of at least two sections, an upper section telescopically engaged within a lower section. The locking mechanism previously described in conjunction with the compression member ideally also is utilized for the leg support. A fixed rack is mounted inside the top section and a movable rack is mounted on the bottom section, or vice versa.

In another aspect of the present invention a tie-down strap composed of nonextendable material is provided to anchor the support tube to the ground. Preferably the upper end of the tie-down strap is attached to the support tube with the same type of clamping assembly employed to secure the compression member and support leg to the support tube. Also, preferably, the lower end of the strap is securable to a baseplate having an opening formed thereon to receive a stake that is driven into the ground or to receive another type of member for securing the baseplate to an immovable object such as a large rock.

BRIEF DESCRIPTION OF THE DRAWINGS

The details of typical embodiments of the present invention will be described in connection with the accompanying drawings, in which:

FIG. 2 is an enlarged, fragmentary, isometric view of a leg support attached to a clamp assembly with portions of the leg support broken away to illustrate a locking mechanism;

DETAILED DESCRIPTION OF THE DRAWINGS

Figure 1:
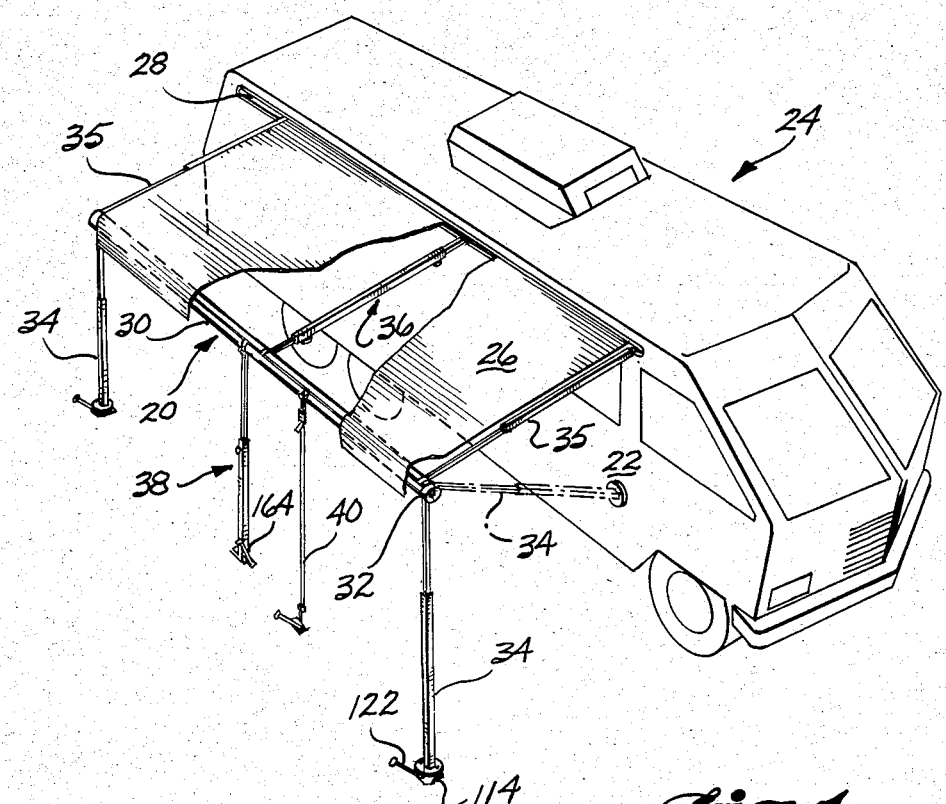
FIG. 1 is an isometric view illustrating an awning support assembly of the present invention employed in conjunction with an awning apparatus mounted on a recreational vehicle.

Referring initially to FIG. 1, an awning apparatus 20 is illustrated as mounted on a sidewall 22 of a recreational vehicle 24. The awning apparatus includes a fabric canopy 26 having its inward edge portion secured along the upper edge portion of vehicle wall 22 with an anchor strip 28. The outward edge of canopy 26 is secured to an elongate, substantially hollow support tube 30, with the ends of the tube closed off with circular caps 32 and supported by telescoping legs 34 pivotally secured to the end caps. Legs 34 may be oriented to rest on the ground or be secured to a lower portion of the vehicle sidewall 22. Support struts 35 extend outwardly from the vehicle sidewall 22 to interconnect with the end portions of the support tube to space the support tube outwardly from the vehicle 24 and retain it in such position. The abovedescribed construction of awning apparatus 20 is well known in the art and does not in and of itself constitute the present invention.

Figure 3:
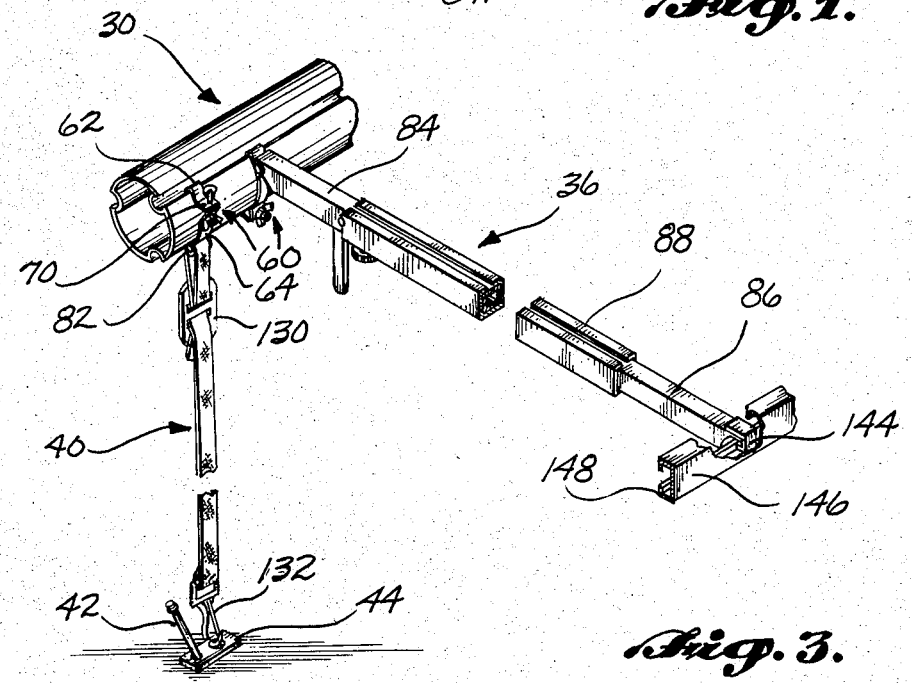
FIG. 3 is an enlarged, fragmentary, isometric view of a compression member and tie-down strap of the present invention.

As illustrated in FIGS. 1 and 3, a compression member or rafter 36 constructed according to the present invention extends outwardly from vehicle sidewall 22 to interconnect with an intermediate portion of support tube 30. The compression rafter pushes outwardly against the support tube spacing it outwardly from vehicle 22 and also assisting in supporting canopy 26.

Additionally, FIGS. 1 and 2 show a leg support 38 constructed according to the present invention extending upwardly from the ground to interconnect with an intermediate portion of support tube 30. The leg support 38 supports the tube 30 above the ground and provides additional support for end legs 34. It is to be understood that leg support 38 can be connected to and used at the ends of the support tube 30 as well as any location between the ends. Also leg support 38 can be mounted to extend from the lower portion of vehicle wall 22 to the support tube without departing from the spirit or scope of the invention.

FIGS. 1 and 3 illustrate a tie-down strap 40 attached to the support tube 30 and anchored to the ground, preferably with a stake 42 driven through a plate 44 attached to the bottom of strap 40. The tie-down strap 40 provides additional stability to the awning assembly 20 during gusty or high winds to prevent the support tube and thus the awning from rising above its normal height.

Figure 4:
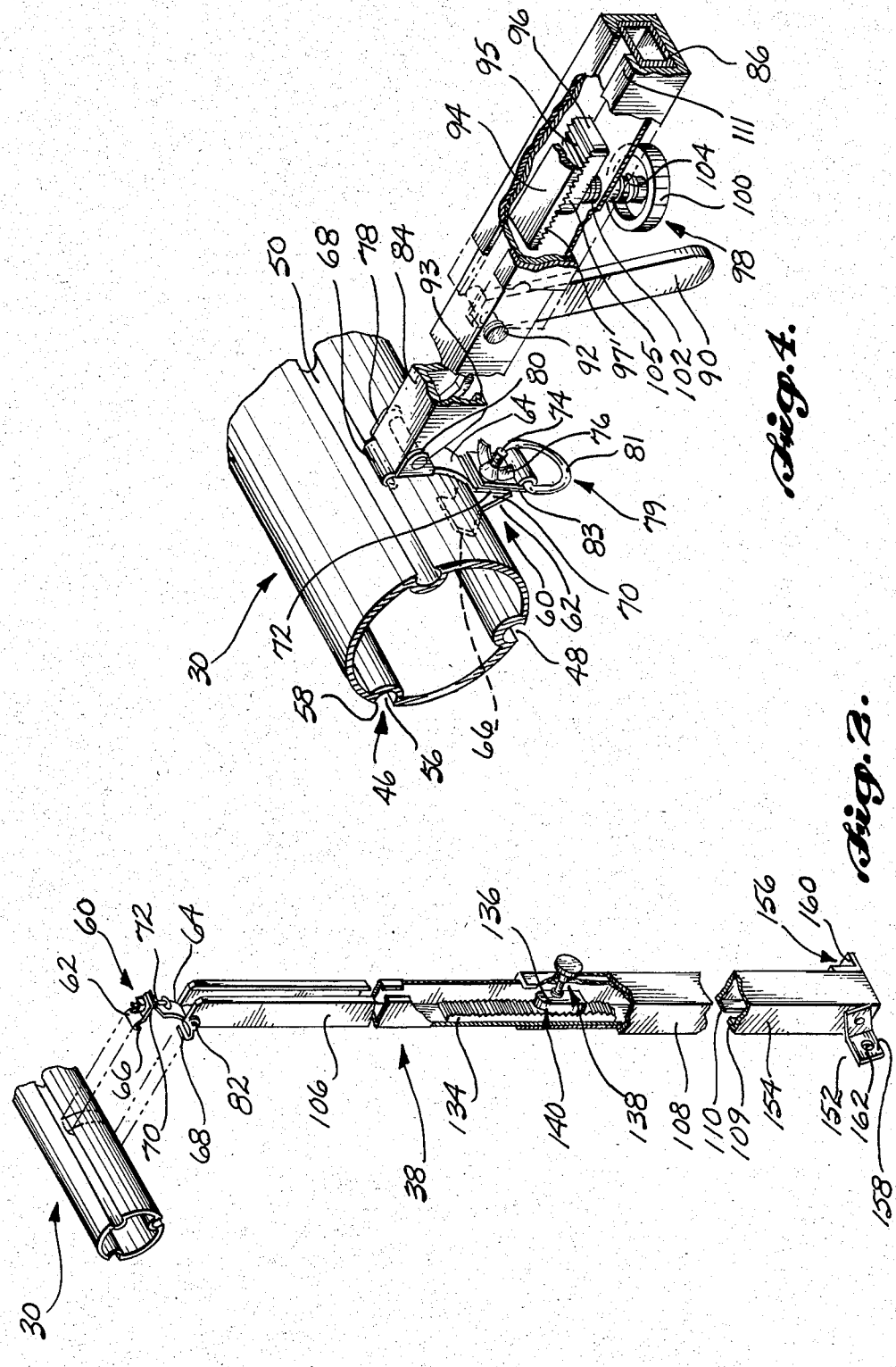
FIG. 4 is an enlarged, fragmentary, isometric view of the outward portion of the compression member with portions of the compression member cut away to illustrate the locking mechanism.
Figure 5:
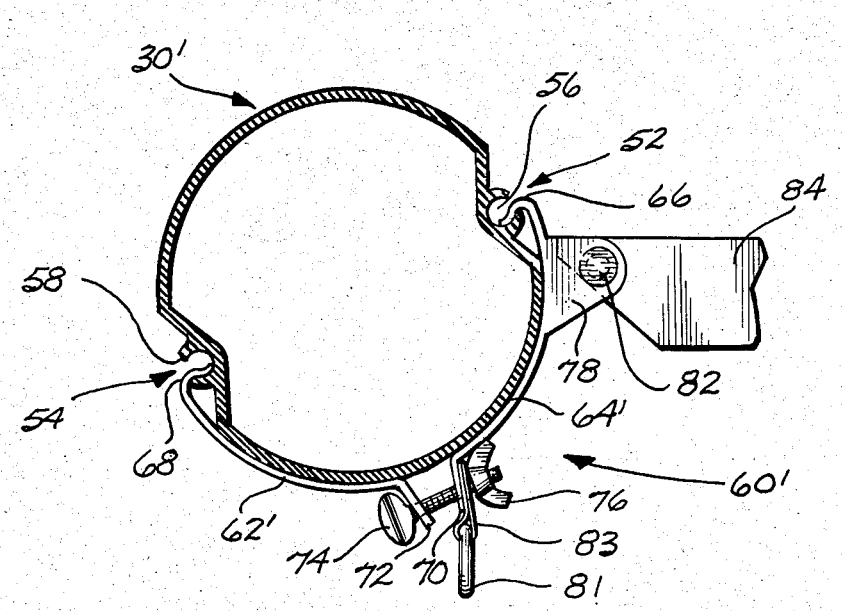
FIG. 5 is an enlarged, cross-sectional view of another preferred embodiment of the present invention showing an alternative clamp assembly; and, FIG. 6 is an enlarged, fragmentary, isometric view of an auxiliary baseplate of the present invention.

More particularly, in FIG. 4, support tube 30 is illustrated as being generally in the form of a circular, hollow tube having a plurality of grooves 46, 48, 50, or alternatively in FIG. 5 support tube 30' includes a pair of grooves 52 and 54, extending along the length thereof. The grooves are spaced circumferentially about the support tube. As most clearly shown in FIG. 5, the grooves are generally circular in cross section and include an enlarged interior or cavity portion 56 and a narrower entrance portion 58 formed in the outer wall of the support tube.

FIGS. 2, 3 and 4 show a clamp assembly 60 for attaching each of the supporting members, i.e., compression members 36, leg support 38 and tie-down strap 40, to the support tube 30. The clamp assembly 60 is composed of elongate, arcuate clamp members or sections 62 and 64 having hook-shaped distal or outer ends 66 and 68, respectively, which engage an edge of the narrow entrance portion 58 of a corresponding support tube groove. The opposite ends of the clamp sections are bent outwardly in a direction away from the support tube to form tabs 70 and 72. Tabs 70 and 72 are drawn together by means of a fastener assembly, such as a thumbscrew 74 and wing nut 76, disposed through a corresponding hole in each tab. The drawing together of the clamp section tabs causes the hook-shaped ends 66 and 68 to become tightly engaged with the edges of the narrow entrance portion. Preferably the sections 62 and 64 are formed from sufficiently flexible material and with a nominal curvature roughly corresponding to the circumference of support tube 60 to bear tightly against the support tube when clamped together.

FIG. 5 shows an alternative preferred embodiment of the present invention wherein clamp assembly 60' includes a clamp section 62' that has a longer arcuate length about the circumference of support tube 30' to enable engagement with groove 56. Ideally, clamp section 64' has the same arcuate length in FIGS. 2, 3, 4 and 5 so that only one such member is required, regardless of the diameter of the support tube or the distance between the two grooves with which the clamp sections are engaged. Other than having a clamp section 62' of a longer arcuate length than corresponding clamp section 62, clamping assembly 60' is constructed identically with clamping assembly 60 shown in FIGS. 2, 3 and 4. Further, ideally, clamp sections, such as section 62 and 62', can be constructed in various arcuate lengths adaptable to configurations of support tube 30 wherein the grooves are spaced closer or further apart or to various diameter support tubes.

Shown most clearly in FIGS. 4 and 5 are two ears 78 and 80, preferably constituting an integral portion of clamp sections 64 and formed by bending from the side of clamp sections 64. The ears are at an angle generally normal to the exterior of the support tube 30 and 30' so as to be disposed in spaced parallel relationship to each other. The supporting members 36 or 38 can be pivotally attached to the clamp 60 by passing a pin 82 through aligned holes in the ears and a corresponding hole in the adjacent portion of the supporting member. In addition, as shown in FIGS. 3, tie-down strap 40 is looped around pin 82.

A hanger assembly 79 as shown in FIGS. 4 and 5 is composed preferably of ring 81 held in place by bracket 83. Bracket 83 is attached to clamp assemblies 60 and 60' by disposing thumbscrew 74 through an opening formed in bracket 83 and secured by wing nut 76. Hanger assembly 79 ideally is used to hang utensils, flower pots or other desired items from the support tube 30.

Compression member 36, as most clearly shown in FIG. 3, is composed preferably of a relatively short, outer end section 84 and a longer, inner end section 86 slidably engaged within a center section 88. Each of the sections 84, 86 and 88 is illustrated as being channel-shaped in cross section with lip portions extending partially across the channel opening to enable the center section 88 to telescopically receive the end sections 84 and 86. Alternatively, the sections 84, 86 and 88 could be formed in other cross-sectional shapes, such as a square or hexagonal tube, without departing from the scope or spirit of the present invention. The sections 84, 86, and 88 of compression member 36 ideally is constructed of high-strength, lightweight material such as aluminum.

As most clearly illustrated in FIG. 4, one end of an elongate, manually graspable lever 90 is rotatably mounted on a pin 92 disposed transversely through end section 84 to enable the lever to depend down through the channel opening. When end section 84 is slid into center section 88, the sections 88 and 86 can be adjusted relative to each other so that the outward end of center section 88 will nominally contact lever 90. Thus, when lever 90 is rotated toward center section 88, counterclockwise in FIG. 4, the lever pushes against the end of center section 88 to force end section 84 outwardly from center section 88, thereby further extending compression member 36. When compression member 36 is mounted on the awning assembly, rotation of lever 90 toward center section 88 will have the effect of forcing the support tube 30 away from the recreational vehicle 24 causing the canopy material to become taut. Once the awning material is at the desired level of tautness, the compression member 36 can be conveniently locked at the length with a closely located locking apparatus as discussed below. After compression member 36 has been locked at a desired length, lever 90 can be rotated in the clockwise direction in FIG. 4 until it is disposed within the interior of end section 84, whereupon the lever can be placed to rest upon one of the tips 93 of the end section.

As shown in FIG. 3, end section 86 has a tongue 144 that extends outwardly and downwardly from the inward end of end section 86 to engage within an anchor strip 146 mounted on sidewall 22 to attach compression members 36 therewith. Tongue 144 hooks against the lower lip 148 of the anchor strip to prevent disengagement from the anchor strip.

It is to be understood that rather than employing three sections 84, 86, and 88, the compression member can be formed from two sections, or four or more sections without departing from the spirit or scope of the present invention. In these alternative configurations, a lever, such as lever 90, may be conveniently and advantageously employed.

FIG. 4 illustrates in detail a locking apparatus for the compression member sections composed of an elongate stationary rack 94 fixedly mounted on the inside surface of the web portion of the channel of end section 84. Preferably, rack 94 is formed with a saw-tooth face 150. Movable racks 96 are mounted on both ends of center section 88 for engagement with a corresponding stationary rack 94. Movable rack 96 also preferably is formed with a saw-tooth face 95 matching that of rack 94. The saw-tooth shaped teeth 97 and 97' of racks 94 and 96, respectively, have one vertical face and one sloped face, thus allowing the teeth of racks 94 and 96 to shift position in only one direction relative to each other when partially engaged while preventing relative movement in the opposite direction. As a result, end sections 84 and 86 are shiftable outwardly from center section 88, but not inwardly, when the corresponding racks are partially engaged. It is to be understood that other designs of teeth may be used on the racks, such as teeth having both vertical faces or faces at an equal slope.

Movable rack 96 is threadably engaged with a threaded member, for instance, in the form of screw 98 which is slidably engaged within a crosshole formed in center section 88. Screw 98 is formed with a smooth shank portion extending through the crosshole. A manually graspable knob 100 is mounted on the outward end of the screw shank portion. Screw 98 is maintained in a generally perpendicular disposition relative to the web wall of center section 88 by an enlarged, circular flange 102 formed on the end of the smooth shank section opposite knob 100. The flange 102 bears against the inside surface of the web wall of center section 88. A coil spring 104 extends over the smooth shank portion of screw 98 disposed outwardly of center section 88, with one end of coil spring 104 abutting the exterior surface of the web wall of center section 88 and the other end of coil spring 104 abutting the inside face of knob 100. Flange 102 is urged against the interior surface of the web wall of center section 88 by the force of coil spring 104 pushing outwardly on knob 100.

Rotation of screw 98 by manually turning knob 100 causes movement of rack 96 toward or away from corresponding rack 94 to lockingly engage or disengage the movable rack with or from the stationary rack 94. Movable rack 96 is prevented from rotating inside center section 88 because the length of rack 96 is greater than the internal transverse width of center section 88. Additionally, rack 96 has a beveled end portion 105 facing end section 84 to allow section 84 to freely slide past movable rack 96 during initial engagement with center section 88.

It will be appreciated that center section 88 is lockingly engaged with inner end section 86 with the same type of locking apparatus, not shown, employed to lock outer end section 84 with center section 88.

As shown in FIG. 2, leg support 38 is composed of two sections, an upper section 106 slidably engaged within lower section 108. Upper section 106 and lower section 108 preferably are formed in a channel-shaped cross section with lips extending partially transversely across the open side of the channel, but leaving a gap running the length of the channel. Lips 109 and 110 of lower section 108 hold upper section 106 in slidable engagement. Leg support 38 ideally is constructed of high-strength, lightweight material such as aluminum. Although described and illustrated as a channel-shaped cross section, it is to be understood that leg support sections 106 and 108 can be constructed of other cross-sectional shapes, such as tubular or other multi-sided shapes.

Preferably, leg support 38 is rotatably mounted to clamp 60 by means of pin 82 in the manner as described above relative to compression member 36. In addition, ideally leg support 38 employs the same type of locking apparatus utilizing a fixed rack 134 mounted in section 106 and a movable rack 136 mounted in section 108 in the manner as described above in relation to compression member 36. Movable rack 136 is threadably engaged with an actuating screw 138 which is constructed and operated in the same manner as screw 98 described above in conjunction with compression member 36. Movable rack 136 is prevented from rotating inside lower section 108 because the length of rack 136 is greater than the internal transverse width of section 108. Additionally, rack 136 has a beveled end portion 140 facing upper section 106 to allow upper section 106 to slide freely past movable rack 136 during initial engagement within lower section 108.

A rotatable angle foot 152 is mounted at the bottom portion of flange wall 154 of lower section 108. Foot 152 pivots about an axis transverse to lower section 108. On the flange wall opposite flange wall 154 is mounted fixed angle foot 156. Angle feet 152 and 156 have tabs 158 and 160, respectively, preferably disposed generally perpendicular to the corresponding flange walls of lower section 108 on which each angle foot is mounted. A hole 162 extends through tabs 158 and 160. Hole 162 allows the use of a stake 164 as shown in FIG. 1, or a rope or other means, not shown, for securely affixing the bottom of leg 38 to the ground or other immovable object. Rotatable angle foot 152 allows the stake 164 or similar member to be driven at an angle into the ground, and also allows leg support 38 to be mounted at an angle to sidewall 22 of motor home 24, in a manner similar to leg support 34, shown in FIG. 1.

Figure 6:
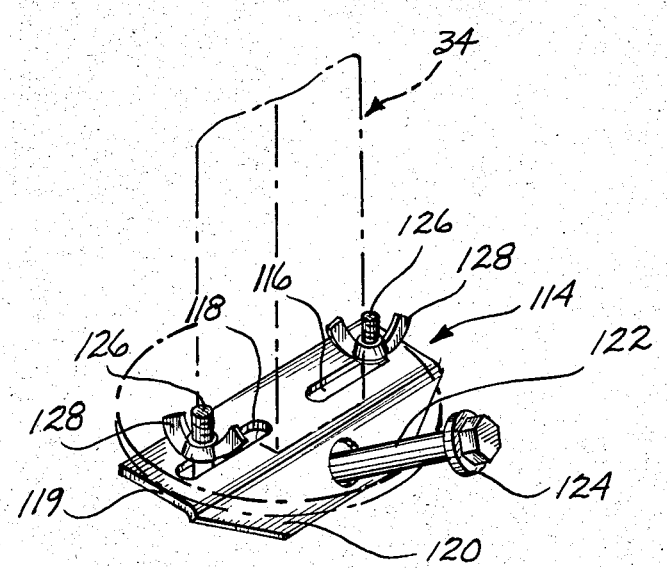

FIG. 6 shows an auxiliary angle plate 114 which can be attached to the bottom of a variety of leg supports, such as leg 34, through two oblong holes 116 and 118 formed in flat base section 119. Angle plate 114 also includes a slanted section 120 that is disposed at an ngle, ranging from ideally 30° to 60°, downward relative to the plane of base section 119 to allow a stake 122 or similar member to be driven at an angle into the ground thereby preventing the stake from being easily pulled out. Additionally, stake 122 has a flange 124 on the head thereof to allow the use of a claw hammer or other device for conveniently pulling the stake out of the ground. Angle plate 114 is secured to the bottom of a leg support with a pair of carriage bolts 126 engaged with wing nuts 128.

In FIG. 3, a tie-down strap 40 is attached to support tube 30 through the use of the same clamp 60 used to attach compression member 36 to tube 30. The upper end of tie-down strap 40 is looped around pin 82 and fastened by a slidable cinch 130. Strap 40 can be constructed of any nonextendable material, such as leather or nylon. The lower end of strap 40 is connected to plate 44 by means of a snap fastener 132 that engages within an opening formed in the plate. The tension of tie-down strap 40 can be adjusted with the slidable cinch 130. Plate 44 is anchored to the ground by a stake 42 extending through a hole formed in the plate.

As will be apparent to those skilled in the art to which the invention is addressed, the present invention may be embodied in forms other than those specifically disclosed above without departing from the spirit or essential characteristics of the invention. The particular embodiments are therefore to be considered in all respects as illustrative and not restrictive. The scope of the present invention is set forth in the appended claim rather than being limited to the examples set forth in the foregoing description.

The embodiments of the invention in which an exclusive property or privilege is claimed are defined as follows:

1. A support assembly for an awning apparatus adapted for attachment to a supporting structure and capable of retraction, the awning apparatus including a support tube, and a canopy having a first edge portion securable to the support tube, the canopy being windable about the support tube, said support assembly comprising:
   (a) means for supporting the awning apparatus; and
   (b) means for attaching said supporting means to the awning apparatus, said attachment means comprising;
     (i) first and second clamping members, each having a hook-shaped distal end portion adapted for engagement within a corresponding opening in the support tube, and a longitudinal portion extending generally circumferentially about a portion of the support tube;
     (ii) means for adjustably interconnecting the longitudinal portions of the clamping members of said attachment means into taut condition relative to the support tube with the end portions of the clamping members engaged within a corresponding support tube opening; and,
     (iii) means for interconnecting said supporting means with said attaching means.

2. The support assembly of claim 1, wherein the support tube includes elongate openings in communication with the exterior of the support tube and extending longitudinally along the support tube, and said hook-shaped ends of said clamping members are capable of being inserted at any location along a corresponding support tube opening.

3. The support assembly of claim 1, wherein when said clamping members are in taut condition the longitudinal portions of said clamping members are generally arcuate in shape and of a curvature generally corresponding to the circumferential curvature of the support tube.

4. The support assembly of claim 1, wherein one of said first and second clamping members includes a pair of ears spaced apart and disposed generally normal to the longitudinal portion of said clamping members for pivotal interconnection to said supporting means.

5. The support assembly of claim 4, wherein said ears each include an aperture, and said means for pivotal interconnection of said supporting means to said attaching means further includes a pin disposed through said apertures and through a corresponding opening in said supporting means.

6. The support assembly of claim 1, wherein said supporting means includes a compression member means for urging the support tube away from the supporting structure.

7. The support assembly of claim 6, wherein said compression member means are composed of a first elongate section telescopically associated with a second elongate section.

8. The support assembly of claim 7, wherein said compression member means further includes locking means for securely locking said first section in selected positions relative to said second section.

9. The support assembly of claim 8, wherein said locking means of said compression member means further comprise:
 (a) first rack means mounted on one of said first and second elongate sections of said compression member means;
 (b) second rack means engageable with said first rack means; and
 (c) means for mounting said second rack means on the other of said first and second elongate sections of said compression member means to shift said second rack means into and out of locking engagement with said first rack means.

10. The support assembly of claim 7, wherein said compression member means includes means for extending said first and second sections of said compression member means relative to each other, said extension means being composed of a lever pivotally mounted in one of said first and second elongate sections at a location relative to the other of said first and second sections to bear against an adjacent portion of the other of the first and second sections as the lever rotates.

11. The support assembly of claim 1, wherein said supporting means includes leg means for vertically supporting the support tube above the ground.

12. The support assembly of claim 11, wherein said leg means includes a first elongate section slidably received in a second elongate section, and means for locking said first elongate section in selective locations relative to said second elongate section.

13. The support assembly of claim 12, wherein said locking means of said leg means further comprises:
 (a) first rack means mounted on one of said first and second elongate sections of said leg means;
 (b) second rack means engageable with said first rack means; and
 (c) means for mounting said second rack means on the other of said first and second elongate sections of said leg means to shift said second rack means into and out of locking engagement with said first rack means.

14. The support assembly of claim 1, wherein said supporting means includes tie-down means for resisting the support tube from lifting or rising above the normal vertical height above the ground in the extended position.

15. The support assembly of claim 14, wherein said tie-down means includes a strap with anchor means for anchoring the lower end of said strap to the ground.

16. A support assembly for an awning apparatus adapted for attachment to a supporting structure and capable of retraction, the awning apparatus including a support tube, and a canopy having an edge portion securable to the support tube, the canopy being windable about the support tube, said support assembly comprising:
 (a) leg means for vertically supporting the support tube above the ground in an extended position; and
 (b) means for attaching said leg means to the support tube, said attachment means comprising:
  (i) first and second clamping members each having a hook-shaped distal end portion adapted for engagement within a corresponding opening in the support tube, and a longitudinal portion extending generally circumferentially about a portion of the support tube;
  (ii) means for adjustably interconnecting the longitudinal portions of the clamping members of said attachment means into taut condition relative to the support tube with the distal end portions of the clamping members engaged within a corresponding support tube opening; and
  (iii) means for interconnecting said leg means with said attaching means.

17. The support assembly of claim 16, wherein said leg means includes a first elongate section slidably received in a second elongate section and means for locking said first elongate section in selective locations relative to said second elongate section.

18. The support assembly of claim 17, wherein said locking means of said leg member include:
 (a) first rack means mounted on one of said first and second sections of said leg means;
 (b) second rack means engageable with said first rack means; and
 (c) means for mounting said second rack means on the other of said first and second sections of said leg means and actuating said second rack means into and out of locking engagement with said first rack means.

19. The support assembly of claim 18, wherein said second rack means includes a portion disposed internally in said first or second section and having a length greater than the internal width of said first or second section, the width being measured transverse to the length of said first or second section on which said second rack means is mounted.

20. The support assembly of claim 18, wherein said mounting means of said second rack means includes a threaded member rotatably mounted to said first or second elongate sections, and said threaded member being threadably engaged with said second rack means whereby rotating said threaded member actuates said second rack means into and out of locking engagement with said first rack means.

21. The support assembly according to claim 16, wherein said leg means includes a plate rotatably mounted on the end of said leg means opposite the support tube, and said plate having an opening formed therein.

22. A support assembly for an awning apparatus adapted for attachment to a supporting structure and capable of retraction, the awning apparatus including a support tube, and a canopy having a first edge portion securable to the support tube, the canopy being windable about the support tube, said support assembly comprising:
(a) compression member means for urging the support tube away from the supporting structure; and
(b) means for attaching said compression member means to the awning apparatus, said attachment means comprising:
(i) first and second clamping members each having a hook-shaped distal end portion adapted for engagement within a corresponding opening in the support tube, and a longitudinal portion extending generally circumferentially about a portion of the support tube;
(ii) means for adjustably interconnecting the longitudinal portions of the clamping members of said attachment means into taut condition relative to the support tube with the distal end portions of the clamping members engaged within a corresponding support tube opening; and
(iii) means for interconnecting said supporting means with said attaching means.

23. The support assembly according to claim 22, wherein:
(a) said compression member means are composed of a first elongate section telescopically associated with a second elongate section; and
(b) said compression member means further including locking means for securely locking said first section in selected positions relative to said second section.

24. The support assembly according to claim 23, wherein said locking means includes:
(a) a first rack means mounted on one of said first and second elongate sections;
(b) a second rack means engageable with said first rack means; and
(c) means for mounting said second rack means on the other of said first and second elongate sections to shift said second rack means into and out of locking engagement with said first rack means.

25. The support assembly according to claim 24, wherein said second rack means at least partially disposed internally in said first or second section and having a length greater than the internal width of said first or second section, the width being measured transverse to said first or second section on which said second rack means is mounted.

26. The support assembly according to claim 23, wherein said compression member means further comprises means for extending said first and second sections of said compression member means relative to each other, said extension means comprising a rotatably actuated lever mounted on one of said first and second elongate sections at a location relative to the other of said first and second sections to bear against an adjacent portion of the other of the first and second sections as the lever is actuated.

27. The support assembly according to claim 26, wherein said lever rotates about a pivot axis disposed generally transverse to the first or second elongate section of said compression member means.

* * * * *